United States Patent Office 2,904,346
Patented Sept. 15, 1959

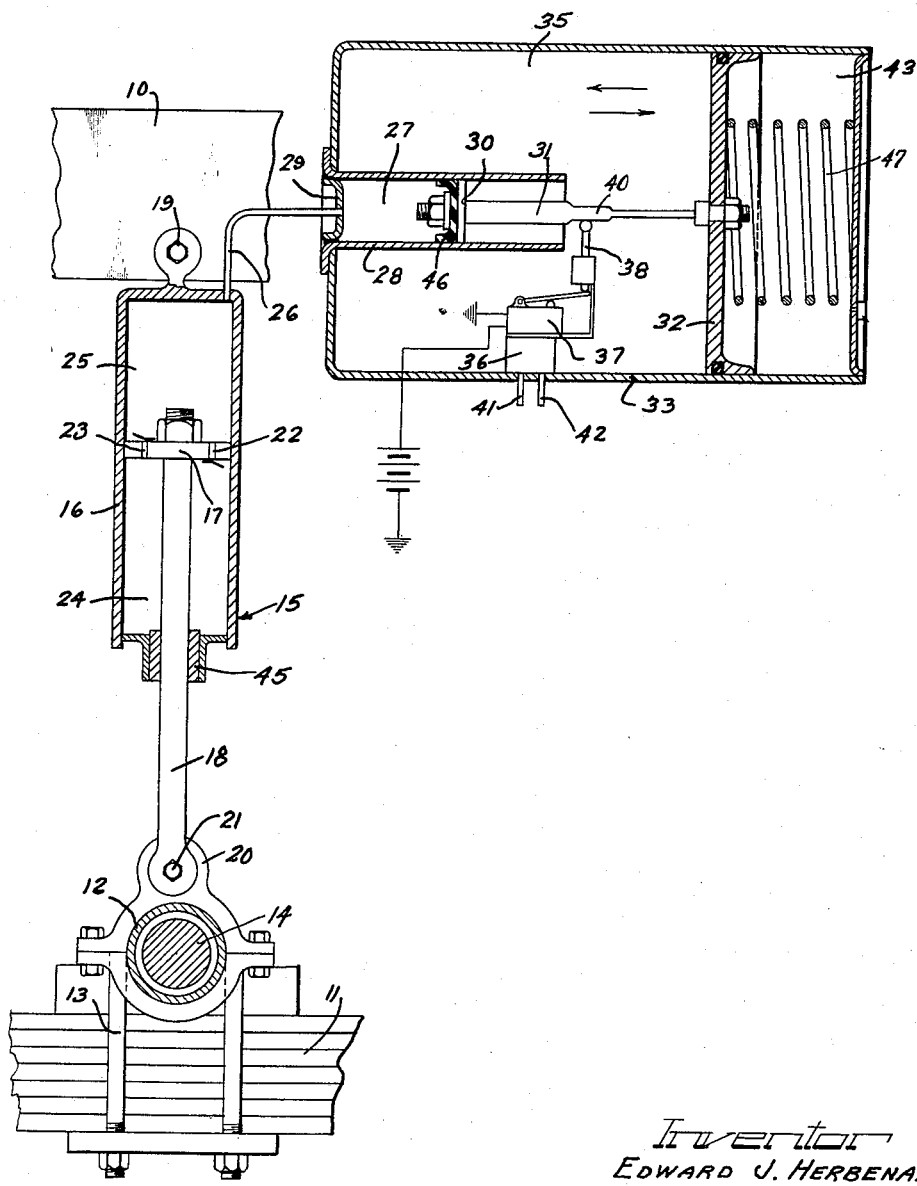

2,904,346

SELF-LEVELING SUSPENSION ASSEMBLY FOR VEHICLES

Edward J. Herbenar, Detroit, Mich., assignor to Thompson Ramo Wooldridge Inc., a corporation of Ohio Application March 20, 1956, Serial No. 572,719

14 Claims. (Cl. 280—124)

The present invention relates to automotive vehicle suspensions and is, more particularly, concerned with the provision of novel mechanism for maintaining the vehicle at a predetermined height or attitude above the road surface over which it is traveling.

In recent years substantial development has taken place in automotive suspension systems, particularly those employed in automotive passenger vehicles. Much of this development work has been related to attempts to provide a suspension system whereby the position of the vehicle body relative to the road surface is maintained substantially constant independent of vehicle load. While many such systems have been envisaged, the apparatus of the present invention provides an extremely simple relatively inexpensive unit which may be employed in conventional vehicle suspension systems as original equipment or as an accessory item for maintaining the vehicle body level.

In accordance with the principles of the present invention a vehicle employing conventional rear springs between the rear axle of the vehicle and the frame is provided with a simple direct acting type shock absorber. This shock absorber is positioned between the rear axle and the frame, at each wheel, and comprises a cylinder within which a piston rod carrying a piston reciprocates. The cylinder is secured to the vehicle frame and the piston rod to the axle, or vice versa. A piston rod of rather substantial diameter is employed in accordance with the principles of the present invention and the entire cylinder is filled with hydraulic fluid. As a result of the utilization of the piston rod on one side only of the piston, movement of the piston within the cylinder requires the displacement of a body of hydraulic fluid equal to the volume of the piston rod. By controlling the displaced hydraulic fluid the position of the piston within the cylinder is controlled and accordingly the relative positions of the vehicle frame and the rear axle may be controlled.

Control of the displaced hydraulic fluid from the direct acting vehicle shock absorber strut is accomplished, in the present invention, by means of a vacuum motor. Hydraulic fluid flowing from the strut, upon a collapse of the vehicle supension, is contained within a reservoir having an expandable wall. As the reservoir expands, a control valve is actuated by such an expansion and applies a source of vacuum to the reservoir to compress it and return the fluid to the hydraulic strut to thereby raise the vehicle from its collapsed position. Time delay means of conventional type are employed in the control valve utilized in order to prevent control of the size of the reservoir during rapid oscillations of the system as distinguished from changes in the load on the vehicle which may be termed a prolonged change. It is, of course, desirable that the level of the vehicle be controlled only to the extent of correcting for such prolonged changes in vehicle loading.

It is, accordingly, an object of the present invention to provide a novel and substantially improved leveling system for automotive vehicles.

Still another object of the present invention is to provide a simplified vehicle leveling system utilizing conventional direct acting shock absorber structure as a major element.

Still another object of the present invention is to provide a vacuum operated vehicle leveling system for leveling a vehicle having conventional body-supporting springs.

Another object of the present invention is to provide a novel vehicle leveling system operable through a shock absorber assembly without impairing the shock absorbing action thereof.

A feature of the invention resides in the provision of a vacuum motor for applying a leveling pressure to a hydraulic leveling strut.

Another feature of the invention is the provision of a direct acting shock absorber comprising a cylinder and a piston wherein the piston is mounted on a piston rod extending through one end only of said cylinder and the provision of means for controlling the flow of fluid to and from the cylinder in response to movement of the piston rod, to provide a leveling force.

Yet a further object of the present invention is to provide a simplified leveling control valve assembly.

Still other and further objects and features of the present invention will at once become apparent to those skilled in the art from a consideration of the attached drawing wherein a preferred embodiment of the present invention is shown by way of illustration only and wherein the figure is a partial side elevational view of an automotive vehicle, in essentially diagrammatic form and illustrating the association of the present invention therewith.

As shown on the drawings:

In the diagrammatic view illustrated, a conventional automotive vehicle frame 10 is connected through conventional spring shackles, not shown, to a spring 11 which is in turn secured to an axle housing 12 by means of a U bolt clamping structure 13. The axle 14 in the illustration shown comprises the rear axle of a vehicle but from the description following it will be apparent to those skilled in the art that the leveling system of the present invention may be utilized with any axle, front or rear.

In addition to the conventional spring connection between the axle and the frame, the axle is connected to the frame through a shock absorber generally indicated at 15 and comprising a cylinder 16, a piston 17 and a piston rod 18. As illustrated, the cylinder 16 is secured to the frame 10 by means of a pivotal connection 19 and the piston rod 18 is likewise secured to the axle housing 12 by means of a clamp 20 and pivotal connection 21. The piston 17 is provided with check valve control restrictive orifices 22 and 23 which operate to pass fluid back and forth between chambers 24 and 25 on the impact and rebound strokes respectively.

In accordance with the principles of the present invention both the chambers 24 and 25 are substantially completely filled with a hydraulic liquid. Accordingly, in view of the volume of the piston rod 18 any movement of the piston 17 back and forth in the cylinder 16 must be accompanied by movement of fluid to and from the cylinder 16 as well as back and forth between the chambers 24 and 25. In the absence of provision for fluid flow to and from the cylinder 16, the shock absorber would act essentially as a rigid link even though orifices 22 and 23 are provided.

The requirement that hydraulic fluid enter or leave the cylinder 16 during movement of the piston 17 is utilized in the present invention for purposes of sensing the relative position of the vehicle frame and the axle and also for modifying the relative positions thereof in order to effect a leveling action. Thus, a conduit 26 connects the cylinder 16 to a reservoir 27 formed by a cylinder 28 having a fixed end wall 29 and a piston 30. The piston rod 31, to which the piston 30 is secured, is in turn connected to a substantially larger piston 32 reciprocably mounted within a large cylinder 33.

As a result of the above construction, movement of the piston 17 within the cylinder 16, resulting from an increase in vehicle load on the frame 10, will cause movement of the piston rod 18 further into the cylinder 16, requiring displacement of fluid from the cylinder into the reservoir 27. This movement will, of course, require that the piston 30 move toward the right as viewed in the drawing, expanding the reservoir 27.

In order that the vehicle frame 10 may be raised relative to the axle 14 after the application of a load thereto, as above described, fluid must be forced from the reservoir 27 back into the cylinder 16 at a sufficiently increased pressure to support the added load. This is accomplished in accordance with the principles of the present invention by the application of vacuum within the chamber 35 of the cylinder 33. Control of the source of vacuum is provided by means of a valve 36 electrically energized by means of switch 37 which is in turn actuated by means of a reciprocal rod 38 in sensing contact with the piston rod 31.

As shown, the piston rod 31 is provided with a cam surface such that upon reciprocation of the piston rod 31 to the right as viewed in the figure will cause downward reciprocation of the rod 38 with resultant closure of the switch 37 and energization of the valve 36 to open vacuum line 41 and close an atmospheric vent 42. The application of a source of vacuum to the chamber 35 will cause movement of the piston 32 toward the left as viewed in the figure as a result of the presence of atmospheric pressure in the chamber 43. The resultant movement of the piston 30, and its rod 31, will restore the rod 31 to the neutral position indicated in which the switch 37 is in neutral position, de-energized, and both the conduits 41 and 42 are closed. Should the load be removed from the frame 10, the vacuum in the chamber 35 will be of such an extent that the piston 32 will be moved to the left tending to raise the vehicle frame beyond its predetermined level condition. With such movement of the piston 32, however, the rod 31 will be moved to the left and the rod 38 will move upwardly still further, energizing switch 37 in a direction reverse to that described for the application of vacuum to the chamber 35, and the valve 36 will be operated to open the atmospheric vent 42 and close the conduit 41 leading to the vacuum source. With the introduction of air under atmospheric pressure of the chamber 35, the piston 32 will move toward the right under the influence of the hydraulic pressure in reservoir 27 until the rod 31 assumes its central position, shown in the drawing, at which time the valve 36 will be locked in its status quo position and further movement of the piston 32 will be prevented.

It will be apparent that adjustment of the level of the vehicle ride may be made by moving the position of the valve 36 with the switch mounted thereon axially of the cylinder 33 in any conventional manner. Likewise, it may be desirable in certain installations to utilize control switch 37 actuated in response to pivotal movement of a rod or the like secured pivotally to the piston rod 31. The cam technique illustrated is preferred, however, since excessive movements of the rod 31 can under no circumstances cause injury to the switch 37.

The description above set forth relative to the shock absorber is, of course, general in nature. The shock absorber diagrammatically shown in the drawings is of conventional construction in which the impact and rebound restrictions 22 and 23 respectively are separate to permit variations in the rate of damping action of the shock absorber. However, it will be apparent that shock absorbing action may be achieved by varying structures without departing from the scope of the present invention. For example, the piston 17 may be perforated by a substantial number of perforations and the conduit 26 provided with a restrictive orifice to provide damping of fluid flow therefrom, thereby providing the main damping action in conduit 26.

Since the usual automotive vehicle encounters many different road conditions, some of which approximate the addition of a heavy load to the vehicle frame, the leveling system of the present invention should preferably be constructed to differentiate between a continually applied load and an instantaneous one. Thus, the switch 37 preferably incorporates an electrical, or mechanical, time delay means preventing actuation of the switch 36 unless and until the reciprocating rod 38 has assumed a changed position for several seconds. Since electrical and mechanical time delay mechanisms are conventional in the known prior art, and specifically form no part of the present invention, they are not illustrated. It will be understood, however, that they are incorporated within the switch structure 37. It has been found that the provision of such time delay means in a vehicle leveling system will prevent any leveling action from occurring during normal ride conditions but will quickly cause the proper leveling action when an additional load is applied to or removed from the vehicle.

In the system described, it is important that the volume of liquid in the cylinder 16, the conduit 26 and the chamber 27 remain substantially constant at all times and it is accordingly desired that proper seals be used. Such seals may be applied as at 45 around the piston rod 18, and at 46 relative to the piston 30. In order to assure the prevention of delayed movement of the piston 30, when collapsing the reservoir 27 during left hand movement as viewed in the figure, a light weight spring 47 may be provided. This spring will supply a small left hand bias tending to maintain some pressure on the hydraulic fluid in the reservoir 27 at all times.

It will thus be seen that I have provided a novel and extremely simple leveling system capable of utilizing conventional shock absorber structures for purposes of providing leveling functions. Through the utilization of a vacuum motor 33, rather than high pressure hydraulic pumps, the cost of the over-all installation is maintained at an absolute minimum while at the same time providing effective leveling operation. The source of vacuum may, of course, take any conventional form such as the engine manifold and an accumulator, or a separate vacuum pump.

Since it will be apparent to those skilled in the art that variations and modifications may be made in the structure hereinabove specifically set forth as a preferred embodiment of the present invention, it is my intention that the scope of the present invention be limited solely by that of the hereinafter appended claims.

I claim as my invention:

1. In a leveling system for a vehicle having a frame member, an axle member and spring means for suspending said axle from said frame, a leveling strut comprising a cylinder secured to one of said members and a piston rod secured to the other of said members, a piston on said rod, substantially incompressible hydraulic fluid filling said cylinder, means permitting the passage of said fluid past said piston in said cylinder, a fluid outlet in said cylinder, a fluid filled reservoir in fluid communication with said cylinder, the volume of said reservoir being a function of the movement of said piston, means for compressing said reservoir, and means sensing the size of said reservoir and responsive to an increase in the size thereof beyond a predetermined volume to actuate said compressing means.

2. In a leveling system for a vehicle having a frame member, an axle member and spring means for suspending said axle from said frame, a leveling strut comprising a cylinder secured to one of said members and a piston rod secured to the other of said members and projecting into said cylinder, a piston on said rod, substantially incompressible hydraulic fluid filling said cylinder, means permitting the passage of said fluid past said piston in said cylinder, a fluid outlet in said cylinder, a fluid filled reservoir, a conduit between said reservoir and said cylinder entering and communicating with said cylinder at a point in said cylinder on the side of said piston opposite from said rod, said reservoir having a volume which is a function of the movement of said piston, means for compressing said reservoir, and means sensing the size of said reservoir and responsive to an increase in the size thereof beyond a predetermined volume to actuate said compressing means.

3. In a leveling system for a vehicle having a frame member, an axle member and spring means for suspending said axle from said frame, a leveling strut comprising a cylinder secured to one of said members and a piston rod secured to the other of said members and projecting into said cylinder, a piston on said rod, substantially incompressible hydraulic fluid filling said cylinder, means permitting the passage of said fluid past said piston in said cylinder, a fluid outlet in said cylinder spaced from said rod, a fluid filled reservoir in fluid communication with said cylinder through said fluid outlet, said reservoir having a volume which is a function of the movement of said piston, means for compressing said reservoir, and means sensing the size of said reservoir and responsive to an increase in the size thereof beyond a predetermined volume to actuate said compressing means, means restricting fluid flow in said system to thereby dampen oscillations of said axle relative to said frame.

4. In a leveling system for a vehicle having a frame member, an axle member and spring means for suspending said axle from said frame, a leveling strut comprising a cylinder secured to one of said members and a piston rod secured to the other of said members and projecting into said cylinder, a piston on said rod, substantially incompressible hydraulic fluid in said cylinder, a fluid outlet in said cylinder, a fluid filled reservoir in fluid communication with said cylinder through said fluid outlet, said reservoir having a volume corresponding to the movement of said piston, means for compressing said reservoir and actuating said piston, and means sensing the size of said reservoir and responsive to an increase in the size thereof beyond a predetermined volume to actuate said compressing means, and means restricting fluid flow in said system to thereby dampen oscillations of said axle relative to said frame comprising a restrictive passageway defined in said piston.

5. In a leveling system for a vehicle having a frame member, an axle member and spring means for suspending said axle from said frame, a leveling strut comprising a cylinder secured to one of said members and a piston rod secured to the other of said members and projecting into said cylinder, a piston on said rod, substantially incompressible hydraulic fluid filling said cylinder, means restricting the flow of fluid past said piston to thereby dampen movement of said axle relative to said frame, a fluid outlet in said cylinder, a fluid filled reservoir in fluid communication with said cylinder through said fluid outlet, means for compressing said reservoir said piston having an axial position in said cylinder proportional to the volume of said reservoir, and means sensing the size of said reservoir and responsive to an increase in the size thereof beyond a predetermined volume to actuate said compressing means.

6. In a leveling system for a vehicle having a frame member, an axle member and spring means for suspending said axle from said frame, a leveling strut comprising a cylinder secured to one of said members and a piston rod secured to the other of said members and projecting into said cylinder, a piston on said rod, substantially incompressible hydraulic fluid filling said cylinder, means restricting the flow of fluid past said piston to thereby dampen movement of said axle relative to said frame, a fluid outlet in said cylinder, a fluid filled reservoir in fluid communication with said cylinder through said outlet, means for compressing said reservoir, the axial position of said piston in said cylinder being proportional to the volume of said reservoir, and means responsive to an increase in the amount of fluid displaced into said reservoir beyond a predetermined volume to actuate said compressing means.

7. In a leveling system for a vehicle having a frame member, an axle member and spring means for suspending said axle from said frame, a leveling strut comprising a cylinder secured to one of said members and a piston rod secured to the other of said members and projecting into said cylinder, a piston on said rod, substantially incompressible hydraulic fluid filling said cylinder, means permitting the passage of said fluid past said piston in said cylinder, a fluid outlet in said cylinder, a fluid filled reservoir in fluid communication with said cylinder through said outlet, piston means for reducing the volume of said reservoir and effecting corresponding movement of said piston axially in said cylinder, and means sensing the volume of said reservoir and responsive to an increase in the volume thereof beyond a predetermined volume to actuate said compressing means, said compressing means comprising a fluid motor employing atmospheric pressure as the motive force.

8. In a leveling system for a vehicle having a frame member, an axle member and spring means for suspending said axle from said frame, a leveling strut comprising a cylinder secured to one of said members and a piston rod secured to the other of said members and projecting into said cylinder, a piston on said rod, substantially incompressible hydraulic fluid filling said cylinder, means permitting the passage of said fluid past said piston in said cylinder, a fluid outlet in said cylinder, an expansible fluid filled reservoir in fluid communication with said cylinder, means for compressing said reservoir, and means sensing the size of said reservoir and responsive to an increase in the size thereof beyond a predetermined volume to actuate said compressing means, said compressing means comprising a reciprocating piston and cylinder fluid motor within the cylinder in which the said reservoir is positioned.

9. In a leveling system for a vehicle having a frame member, an axle member and spring means for suspending said axle from said frame, a leveling strut comprising a cylinder secured to one of said members and a piston rod secured to the other of said members and projecting into said cylinder, a piston on said rod, substantially incompressible hydraulic fluid filling said cylinder, means permitting the passage of said fluid past said piston in said cylinder, a fluid outlet in said cylinder, an expansible fluid filled reservoir in fluid communication with said cylinder, means for compressing said reservoir, and means sensing the size of said reservoir and responsive to an increase in the size thereof beyond a predetermined volume to actuate said compressing means, said sensing means incorporating time delay means for preventing actuation of said compressing means on other than sustained changes in load on said frame.

10. In combination in a vehicle leveling system, a frame member, an axle member, spring means resiliently suspending said axle relative to said frame, leveling mechanism connected between said members and comprising a cylinder connected to one of said members and a piston rod secured to the other of said members, said rod having a piston thereon slidably mounted in said cylinder and said piston rod being positioned through one end of said cylinder, hydraulic fluid in said cylinder on both sides of said piston, means permitting gradual passage of fluid back and forth past said piston, a fluid confining reservoir, a conduit connecting said cylinder with said reservoir, a second piston in said reservoir movable to compress or enlarge said reservoir when said piston is moved, a second piston rod carried by said last named piston, actuating means on said second rod for compressing said reservoir to force fluid into said cylinder and means for sensing the position of said second rod and responsive to expansion of said reservoir beyond a predetermined volume to energize said actuating means to compress said reservoir to said predetermined volume.

11. In combination in a vehicle leveling system, a frame member, an axle member, spring means resiliently suspending said axle relative to said frame, leveling mechanism connected between said members and comprising a cylinder connected to one of said members and a piston rod secured to the other of said members, said rod having a piston thereon slidably mounted in said cylinder and said piston rod being positioned through one end of said cylinder, hydraulic fluid in said cylinder on both sides of said piston, means permitting gradual passage of fluid back and forth past said piston, a fluid confining reservoir, a conduit connecting said cylinder with said reservoir, a second piston in said reservoir movable to compress or enlarge said reservoir when said piston is moved, a second piston rod carried by said last named piston, actuating means on said second rod for compressing said reservoir to force fluid into said cylinder and means for sensing the position of said second rod and responsive to expansion of said reservoir beyond a predetermined volume to energize said actuating means to compress said reservoir to said predetermined volume, said sensing means comprising a cam on said second rod and a member engageable with said cam controlling said actuating means.

12. In combination in a vehicle leveling system, a frame member, an axle member, spring means resiliently suspending said axle relative to said frame, leveling mechanism connected between said members and comprising a cylinder connected to one of said members and a piston rod secured to the other of said members, said rod having a piston thereon slidably mounted in said cylinder and said piston rod being positioned through one end of said cylinder, hydraulic fluid in said cylinder on both sides of said piston, means permitting gradual passage of fluid back and forth past said piston, a fluid confining reservoir, a conduit connecting said cylinder with said reservoir, a second piston in said reservoir movable to compress or enlarge said reservoir when said piston is moved, a second piston rod carried by said last named piston, actuating means on said second rod for compressing said reservoir to force fluid into said cylinder and means for sensing the position of said second rod and responsive to expansion of said reservoir beyond a predetermined volume to energize said actuating means to compress said reservoir to said predetermined volume, said reservoir comprising a cylinder having said second piston as an end wall thereof and said actuating means comprising a vacuum motor the evacuated chamber of which encloses said reservoir.

13. In a leveling system for a vehicle having a frame member, an axle member and spring means for suspending said axle member from said frame member, a leveling strut comprising a cylinder secured to one of said members and a piston rod secured to the other of said members and projecting into said cylinder, a piston on said rod, substantially incompressible hydraulic fluid filling said cylinder, means permitting the passage of fluid past said piston in said cylinder, a fluid outlet in said cylinder, a fluid reservoir in communication with said cylinder through said outlet, a piston reciprocable in said reservoir for determining the volume of said reservoir and the position of said first piston in said cylinder, means sensing the volume of said reservoir and means for actuating said second piston when said reservoir exceeds a predetermined volume to reduce the volume of said reservoir and to actuate said first piston.

14. In a leveling system for a vehicle having a frame member, an axle member and spring means for suspending said axle member from said frame member, a leveling strut comprising a cylinder secured to one of said members and a piston rod secured to the other of said members and projecting into said cylinder, a piston on said rod, substantially incompressible hydraulic fluid filling said cylinder, means permitting the passage of fluid past said piston in said cylinder, a fluid outlet in said cylinder, a fluid reservoir in communication with said cylinder through said outlet, a piston reciprocable in said reservoir for determining the volume of said reservoir and the position of said first piston in said cylinder, means sensing the volume of said reservoir, and means for actuating said second piston when said reservoir exceeds a predetermined volume to reduce the volume of said reservoir and to actuate said first piston, said means for actuating said second piston and reducing the volume of said reservoir comprising a third piston and cylinder fluid motor, said third piston being fixedly secured to said second piston.

References Cited in the file of this patent
UNITED STATES PATENTS

| | | |
|---|---|---|
| 1,641,640 | Myers | Sept. 6, 1927 |
| 2,139,178 | Stevens | Dec. 6, 1938 |
| 2,593,040 | Lloyd | Apr. 15, 1952 |
| 2,812,954 | Lyon | Nov. 12, 1957 |